United States Patent [19]

Kakinuma et al.

[11] Patent Number: 4,812,632

[45] Date of Patent: Mar. 14, 1989

[54] PORTABLE MAGNETIC CARD READING AND WRITING APPARATUS WITH VERIFICATION OF CONSTANT AND USER SUPPLIED DATA

[75] Inventors: Koichiro Kakinuma; Makoto Ando, both of Tokyo; Masahiko Sawa, Kanagawa; Hideaki Ohmuro, Chiba; Akira Ohryo, Tokyo; Tadahiko Nakamura, Kanagawa, all of Japan

[73] Assignee: Sony Corporation, Tokyo, Japan

[21] Appl. No.: 850,673

[22] Filed: Apr. 11, 1986

[30] Foreign Application Priority Data

Apr. 15, 1985 [JP] Japan ................................ 60-80027

[51] Int. Cl.⁴ .......................... G06K 5/00; G06K 7/08
[52] U.S. Cl. ........................................ 235/479; 360/2; 235/419; 235/432; 235/449; 235/480; 235/379
[58] Field of Search ................ 235/375, 376, 377, 379, 235/380, 384, 493, 485, 483, 480, 477, 449, 432, 419, 475, 476, 479; 360/2; 364/401–403, 406, 408

[56] References Cited

U.S. PATENT DOCUMENTS

| | | | |
|---|---|---|---|
| 3,501,622 | 3/1970 | Weir et al. | 235/384 |
| 3,705,396 | 12/1972 | Nagaki et al. | 235/477 |
| 3,946,202 | 3/1976 | Taniguchi et al. | 235/380 |
| 4,053,735 | 10/1977 | Foudos | 235/419 |
| 4,231,072 | 10/1980 | Toyama | 360/2 |
| 4,319,131 | 3/1982 | McGeary et al. | 235/493 |
| 4,494,127 | 1/1985 | King | 235/377 |
| 4,608,485 | 8/1986 | Miura | 235/379 |
| 4,635,219 | 1/1987 | Howard | 235/432 |
| 4,686,357 | 8/1987 | Dounno et al. | 235/419 |

Primary Examiner—Raymond F. Cardillo
Assistant Examiner—Robert A. Weinhardt
Attorney, Agent, or Firm—Hill, Van Santen, Steadman & Simpson

[57] ABSTRACT

A portable card writer for a card with a magnetic stripe provided thereon comprises a chassis, a drive mounted on the chassis for moving the card to and fro, guided along the chassis, a magnetic writing head mounted on the chassis, a magnetic reading head mounted on the chassis, and a printer for writing data in the card at a portion other than the magnetic stripe.

11 Claims, 9 Drawing Sheets

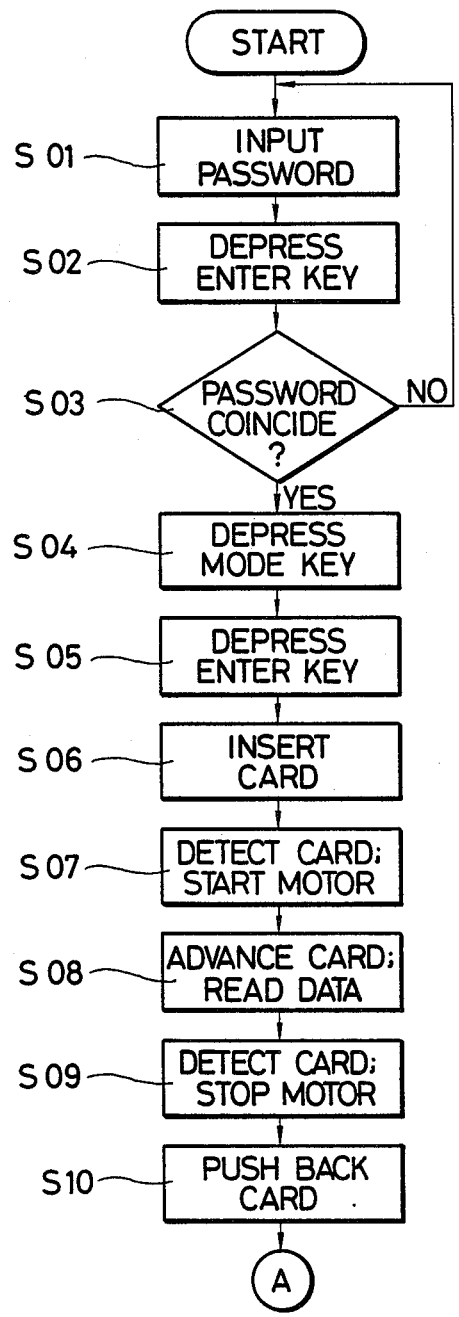

PORTABLE MAGNETIC CARD READING AND WRITING APPARATUS WITH VERIFICATION OF CONSTANT AND USER SUPPLIED DATA

BACKGROUND OF THE INVENTION

1. Field of the Invention

The present invention relates to a portable magnetic card writer for a card such as a check card with a magnetic stripe provided thereon.

2. Description of the Prior Art

There has been known a card type recording and reproducing apparatus in which a magnetic card having a magnetic stripe thereon for recording data is linearly moved to and fro. In such prior art card type magnetic recording and reproducing apparatus, it is arranged that data are written on, or read out from the magnetic stripe of the card by a writing head or reading head while, for example, the card is moved backward.

The prior art card type magnetic recording and reproducing apparatus, however, has been unable to write new data onto a magnetic card in consideration of prerecorded data therein and, further, following the writing, to readily and quickly check whether or not the writing has been made correctly. Therefore, a user of the apparatus who made an error in the writing was unable to quickly respond to the error committed.

SUMMARY OF THE INVENTION

Accordingly, an object of the invention is to provide a portable card writer capable of writing new data in a card, taking data prerecorded therein into consideration and of checking readily and quickly whether or not the new writing has been made correctly.

Another object of the invention is to provide a portable magnetic writer of a simple and compact structure.

The above mentioned and other objects of the invention are achieved by the invention in the following manner. That is, a portable magnetic card writer for a card with a magnetic stripe provided thereon, of the invention, comprises a chassis, driving means mounted on the chassis for moving the card to and fro, means for guiding the card along the chassis, a magnetic writing head mounted on the chassis, a magnetic reading head mounted on the chassis adjacent to the magnetic writing head, and printer means for simultaneously visibly writing the data on the card at a portion other than the magnetic stripe.

Other and further objects of this invention will become obvious upon an understanding of the illustrative embodiment hereinafter described or will be indicated in the appended claims, and various further advantages will occur to one skilled in the art upon employment of the invention in practice.

BRIEF DESCRIPTION OF THE DRAWINGS

FIGS. 10A and 10B are flow charts.

DESCRIPTION OF THE PREFERRED EMBODIMENT

Figure 1:
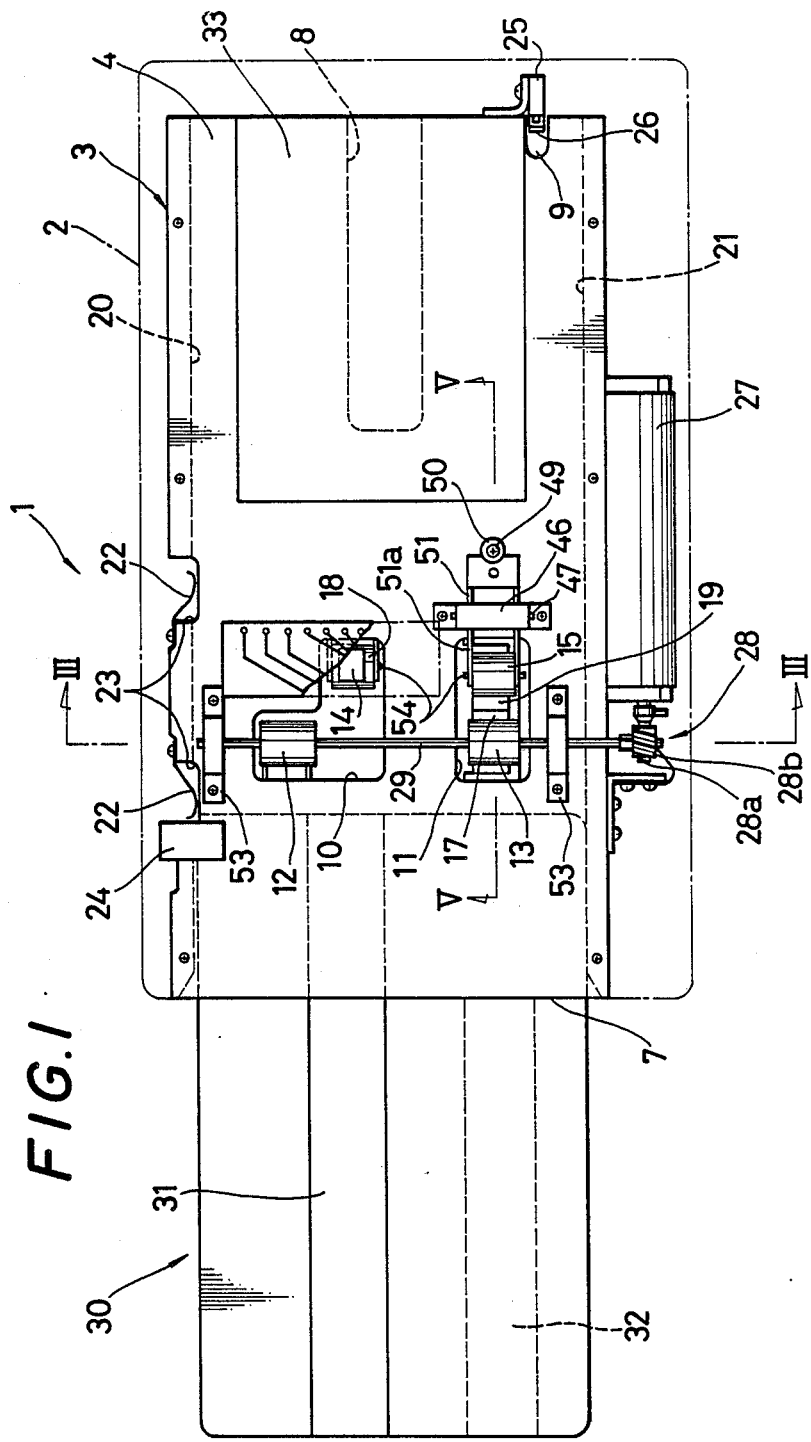
FIG. 1 is a schematic plan view of an entire body of a card type recording and reproducing apparatus for issuing a check card to which the invention is applied.

A preferred embodiment of the invention applied to a card type recording and reproducing apparatus for issuing a check card will be described below with reference to accompanying drawings.

FIGS. 1 to 7 show an appropriate according to an embodiment of the invention. A card guide portion 3 of the card type recording and reproducing apparatus 1 is formed by an upper chassis 4 and a lower chassis 5 united with each other and providing a card passing slit 6. The thickness of the card passing slit 6 is slightly larger than the thickness of a single card 30 by slightly smaller than two such cards. The width of the slit 6 is slightly larger than that of the card 30. The card guide portion 3, after being provided with various parts, is enclosed by an outer casing 2. The front panel of the outer casing 2 is fitted with a keyboard formed of, for example, a sheet key and a display board employing, for example, a liquid crystal device. A control system consisting of a CPU, input and output control units, ROM and RAM are arranged in the outer casing 2.

At one end of the card guide portion 3, there is formed a card inlet 7 also serving as a card outlet between the upper chassis 4 and lower chassis 5. At the end of the upper chassis 4 opposite to the card inlet 7, there is formed a long opening 8 for providing removal of a card in an emergency. The width of the opening 8 is such that a finger of the user can be inserted therein (for example, 7 to 15 mm) and the depth thereof is enough to push the card 30 toward the card inlet 7 with the finger. The opening 8 for taking out a card is normally covered by, for example, an adhesive tape 33 applied to the surface of the upper chassis 4, whereby foreign matter such as dust is prevented from entering the slit 6 through the opening 8.

The data record card 30 to be used as a check card is provided with a heat sensitive stripe 31 consisting of heat sensitive paper disposed on its front surface and a magnetic strip 32 consisting of a magnetic tape disposed on its back side, whereby the card type recording and reproducing apparatus 1 is enabled to record or reproduce invisible data in or from the card 30 and to record visible data thereon. The data record data 30 may have a rectangular shape and size substantially the same as those of the well-known credit card and the body of the card 30 can be made of elastic plastic paper, or the like, having a thickness, for example, of 0.1 to 0.5 mm.

A motor 27 is fixed to the card guide portion 3 by screws. A worm 28a is fixed to the shaft of the motor 27 and a worm wheel 28b is fixed to one end of a drive shaft 29. They engage with each other to form a worm drive 28. The drive shaft 29 is rotatably supported by a pair of fixing plates 53 which are mounted by screws to the upper chassis 4. The drive shaft 29 is provided with a pair of card driving rollers 12 and 13 fixed thereto.

Figure 2:
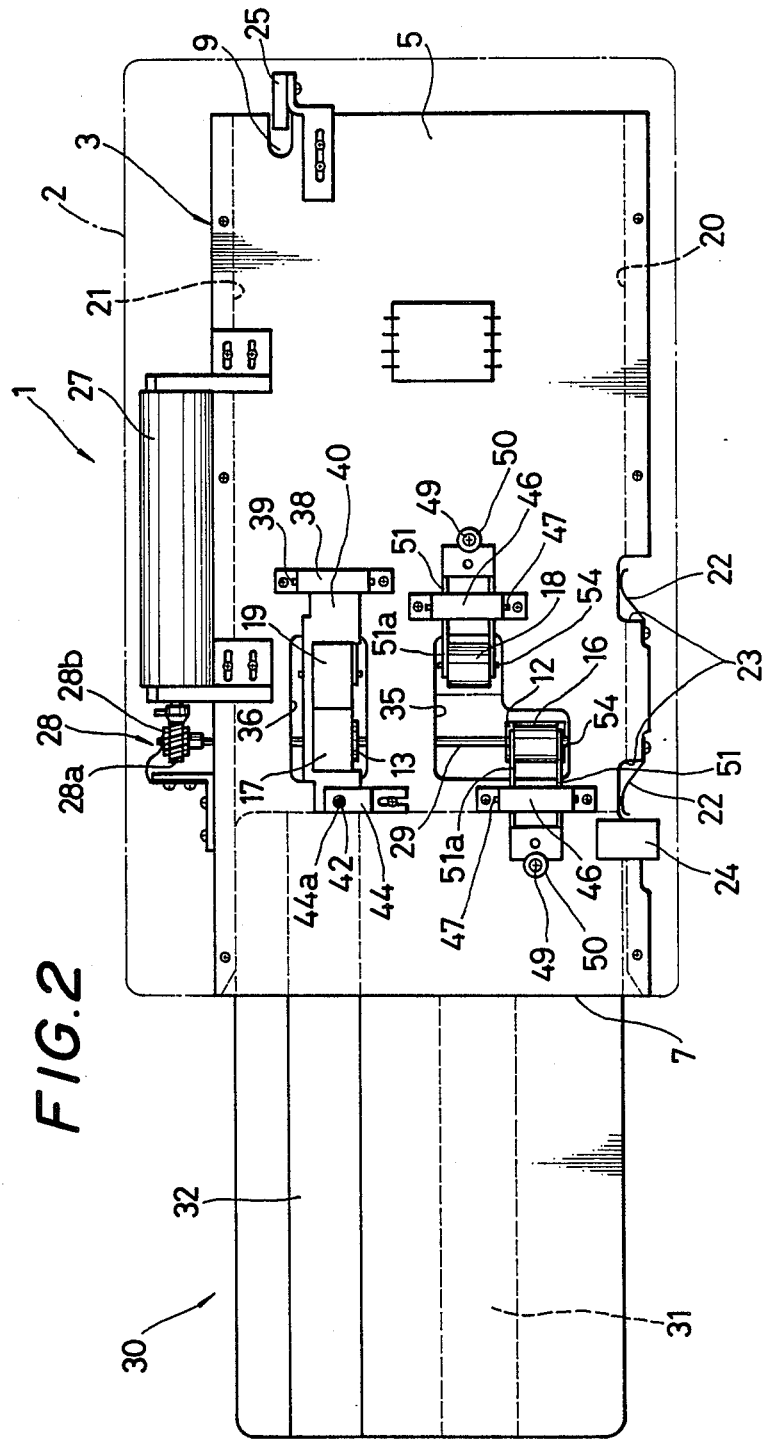
FIG. 2 is a bottom view of the same.
Figure 3:
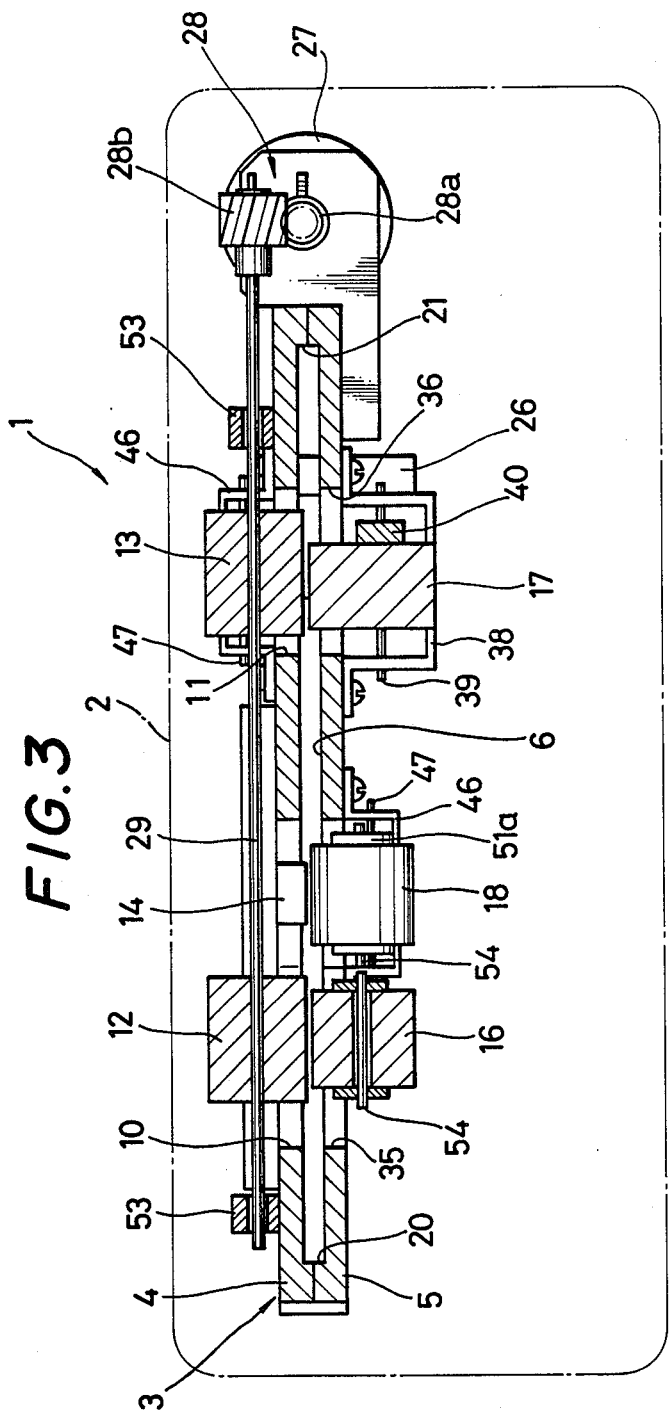
FIG. 3 is an enlarged cross-sectional view taken along line III—III of FIG. 1.

The upper chassis 4 is provided with openings 10 and 11. In the opening 10, there are disposed a thermal head 14 and the card driving roller 12. As shown in FIGS. 2 and 5, in the other opening 11, there are disposed a pad roller 15 and the other card driving roller 13. The lower chassis 5 is provided with openings 35 and 36 corresponding to the openings 10 and 11 of the upper chassis 4, respectively. In the openings 35 opposing the opening 10, there are disposed a pinch roller 16 and a pad roller 18 to oppose the card driving roller 12 and the thermal head 14, respectively. In the opening 36 opposing the opening 11 there are disposed a magnetic reading head 17 and a magnetic writing head 19 opposite to the card driving roller 13 and the pad roller 15, respectively.

Figure 4:
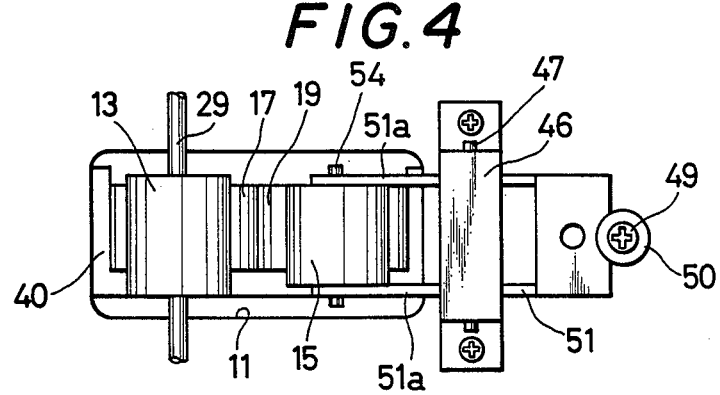
FIG. 4 is an enlarged view of the main portion of FIG. 1.
Figure 5:
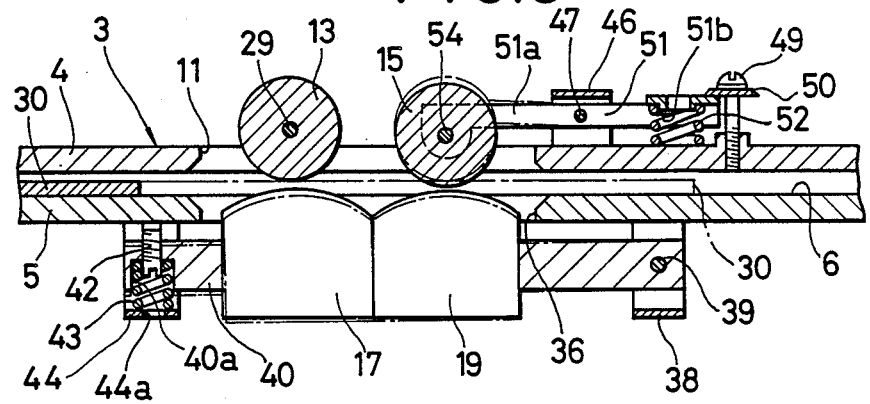
FIG. 5 is an enlarged cross-sectional view taken along line V—V of FIG. 1.
Figure 6:
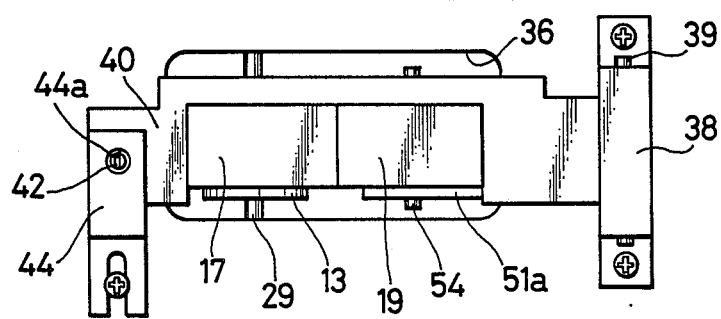
FIG. 6 is an enlarged view of the main portion of FIG. 2.

As clearly shown in FIGS. 4 and 5, the pad roller 15 is supported by a rotatable shaft 54 borne by a pair of arm portions 51a of a lever 51 which is formed so as to have a channel cross-section. The portion substantially in the center of the lever 51 is rotatably supported by a supporting shaft 47 which is borne at its both ends by a pivot plate 46 fixed to the upper chassis 4 by screws. Between an engagement portion 51b formed at the other end of the lever 51 and the upper chassis 4, there is interposed a compression spring 52, so that the pad roller 15 is urged in the direction to rotate counterclockwise in FIG. 5 around the supporting shaft 47. The mentioned other end of the lever 51 is prevented from moving upward by a washer 50 which is put on an adjustment screw 49 screwed in the upper chassis 4.

The magnetic reading head 17 and the magnetic writing head 19 are integrally fixed by spot welding, or the like, to a lever 40, sequentially in the direction of the forward travel of the card 30 (toward the right as seen in FIG. 5). One end of the lever 40 is rotatably supported by a supporting shaft 39, which is supported at both ends by a pivot plate 38 fixed to the lower chassis 5 by screws. The other end of the lever 40 is inserted between a spring fixing plate 44 fixed to the lower chassis 5 by screws. The lever 40 is provided with a recessed engagement portion 40a at the mentioned other end on the side opposite to the lower chassis 5. There is interposed a compression spring 43 between the engagement potion 40a and the spring fixing plate 44. Accordingly, the lever 40 and, hence, the magnetic reading head 17 and magnetic writing head 19, together, are urged in the direction to rotate clockwise in FIG. 5 around the supporting shaft 39. In the bottom portion of the engagement portion 40a, an adjustment screw 42 is screwed, and in the spring fixing plate 44 at its portion opposing the adjustment screw 42, there is made an adjustment hole 44a. Accordingly, the adjustment screw 42 can be screwed in or out with a screwdriver or the like inserted through the adjustment hole 44a.

By screwing in or out the adjustment screw 49, the lever 51 is rotated in the clockwise or counterclockwise direction in FIG. 5 around the supporting shaft 47. As a result of this rotation, the pad roller 15 is raised or lowered in FIG. 5. On the other hand, by screwing in or out the adjustment screw 42, the lever 40 is rotated in the counterclockwise or clockwise direction in FIG. 5 around the supporting shaft 39, so that the magnetic reading head 17 and the magnetic writing head 19 are lowered or raised in FIG. 5. In the described manner, the space between the card driving roller 13 and the magnetic reading head 17 and that between the pad roller 15 and the magnetic writing head 19 can be adjusted by the screwing in or out of the adjustment screws 42 and/or 49. The card driving roller 13 serves as a pad roller for the magnetic reading head 17. The pinch roller 16 and the pad roller 18 are supported on the lower chassis 5 by means of a lever 51, a fixing plate 46, a compression spring 52, and adjustment screw 49 and a washer 50 structured similarly to the case with the pad roller 15.

The space between the card driving roller 13 and the magnetic reading head 17 in general is preferred to be larger than zero to prevent such trouble as sticking to each other of pressure portions of the card driving roller 13 and the magnetic reading head 17 at a time when the apparatus is stopped due to deterioration of rubber on the portions, deformation of the rubber by urging force, and/or damage of the magnetic reading head 17 and the card driving roller 13. As a matter of course, the space is made smaller than the thickness of the card 30. The same thing is applied to each of the spaces between the pad roller 15 and the magnetic writing head 19, between the pad roller 18 and the thermal head 14, and between the pinch roller 16 and the card driving roller 12.

A pair of spaced notched portions 23 are provided in the card guide portion 3 on one side thereof to communicate with the slit 6. In these notched portions 23 are disposed a pair of card position control springs 22 with the end thereof extending beyond the one side 20 of the slit 6. A card 30 introduced into the card traveling slit 6 is urged by the pair of springs 22 downward in FIG. 1 so that the card is allowed to travel sliding along the other side 21 of the slit 6 and is positioned thereby.

In the vicinity of the one side 20 of the slit 6, there is provided a start switch 24 such as an optical switch or the like for detecting introduction of the card 30 into, and withdrawal from, the slit 6 in the vicinity of the slide of the slit 6 on the opposite end to the card inlet 7, a stop switch 25 such as a microswitch or the like is positioned, serving to control the final point of the forward traveling of the card. An actuating lever 26 of the switch 25 projects through a notched portion 9 into the slit 6.

Figure 8:
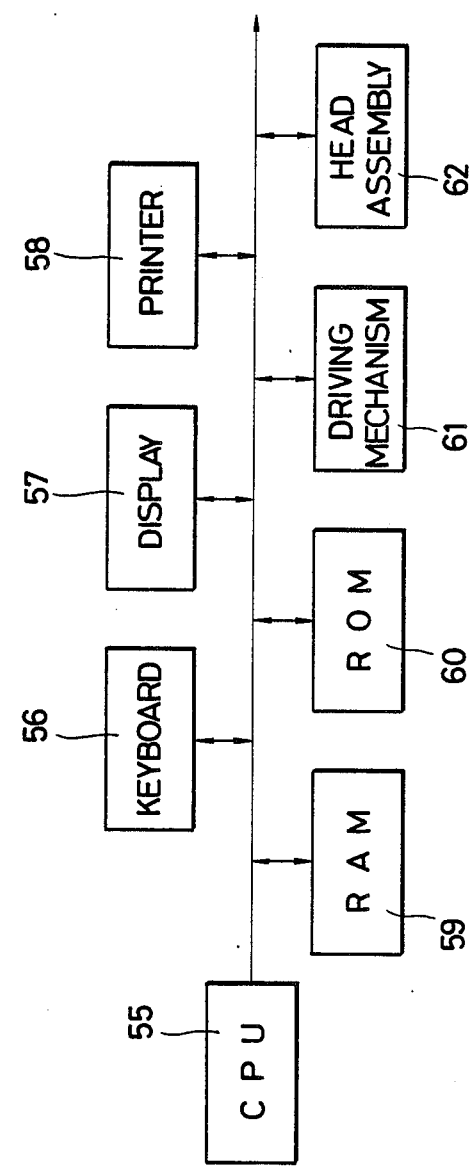
FIG. 8 is a circuit diagram.

The above described card type recording and reproducing apparatus 1 can be applied to a check issuance apparatus for issuing a check card operable online. FIG. 8 indicates a circuit structure of the case where the card type recording and reproducing apparatus of the present invention is applied to a check issuance apparatus.

Referring to the Figure, a control circuit 55 consisting of a CPU or the like controls a display device 57 and an internal printer 58 in response to operation of a keyboard 56. The CPU 55 also controls writing of such data as date and amount in RAM 59 in accordance with a program recorded in a ROM 60, reading out of data from the RAM 59, operation of a driving mechanism 61, and reading and writing by a head assembly 62. The driving mechanism 61 includes the above described motor 27 and controls the inward and outward movement of the check card 30. The head assembly 62 includes the above mentioned reading head 17 and writing head 19, whereby reading and writing operations for a check card are performed.

Figure 9:
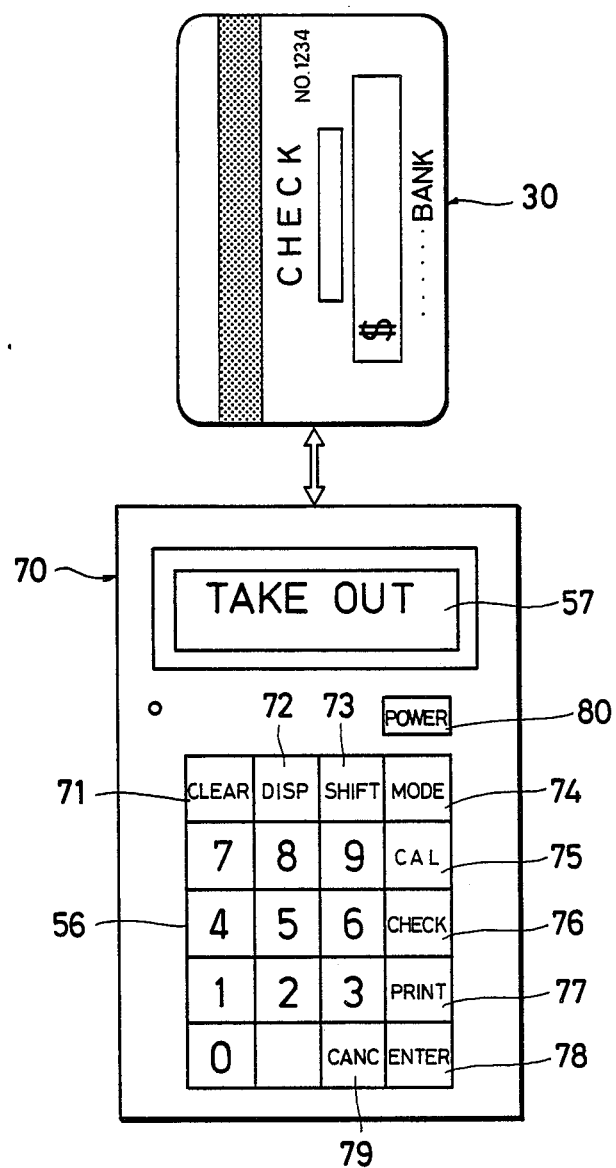
FIG. 9 is a plan view indicating an operator panel of the apparatus and a check card.

FIG. 9 shows an operator panel surface of a check issuance apparatus 70. On the operator panel are disposed a ten-key pad for 0 to 9, a clear key 71, a display key 72, a shift key 73, a mode selection key 74, a calculator key 75, a check key 76, a print key 77, an enter key 78, a cancel key 79, a power key 80 and a display device 57.

The mode selection key 74 is used for serially selecting a check issuance mode, password changing mode, address and name changing mode and so on, by being repeatedly depressed. The shift key 73 is used for changing date, time, and so on. The check key 76 is used for a checkup of a check card 30 returned to the issuer after going through such transactions as receipt of money or encashment. The enter key 78 is used for entering a password, entering a check issuance mode and entering specific data at the time of issuing a check, which will be described later. The print key 77 is used for making an external printer (not shown) print out contents of the display portion 57. The ckeck issuance apparatus 70 is adapted to be used also as an ordinary electronic calculator by operating the calculator key 75. The check issuance apparatus 70 is also adapted to be rendered operative when the password which the issuer only knows is entered.

Figure 10B:
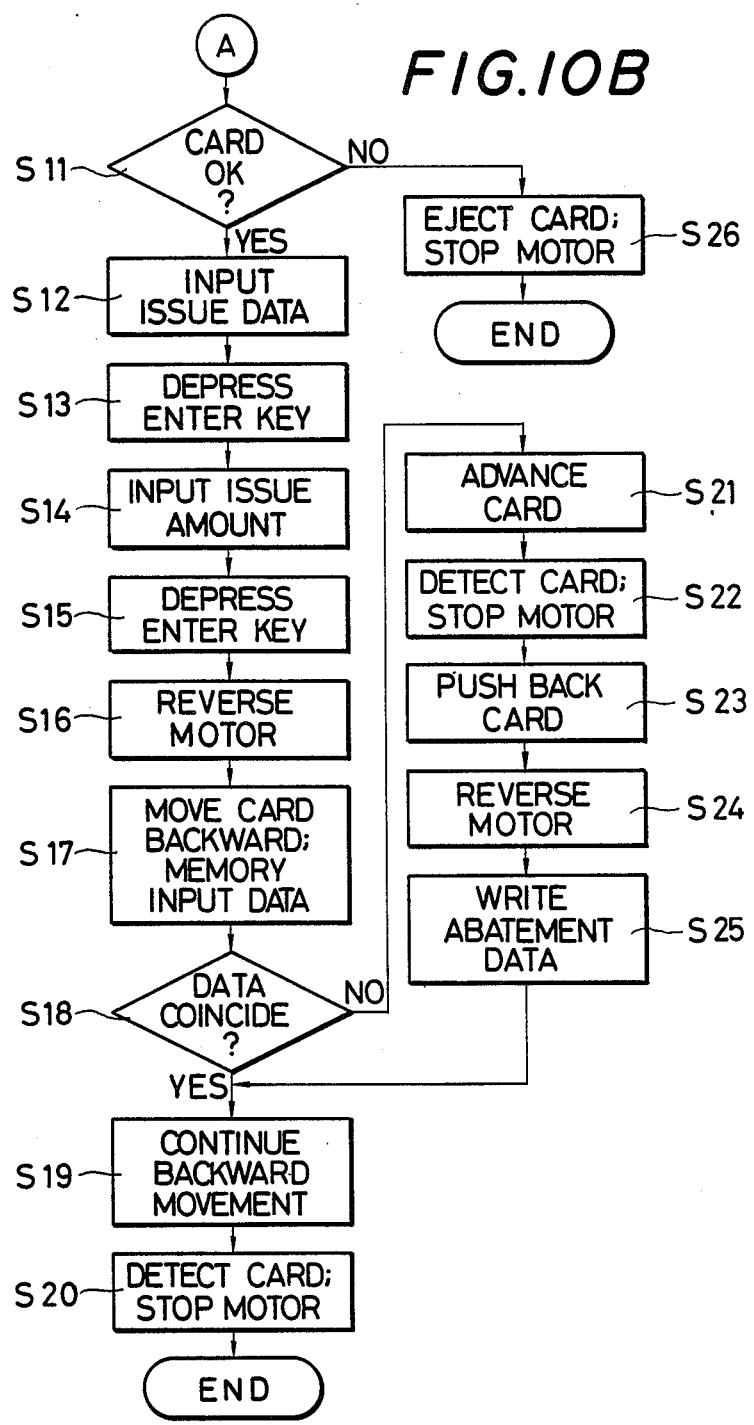

Operations for issuing a check of the above described check issuance apparatus 70 will be described below referring to flow charts of FIGS. 10A and 10B and based on FIGS. 1 to 9. Upon lending the check issuance apparatus from a financial agency, such as a bank, to a check issuer who opens a current account with the bank, such data as a password (code number, etc.), which has been previously determined between the bank and the check issuer, a bank code, a branch code and an account number are stored in the RAM 59 of the card type recording and reproducing apparatus. When the data record card 30 as a check card is handed to the check issuer, the bank code, serial number, branch code and the account number are recorded in the magnetic strip 32 of the card.

When preparing issuance of a check card with necessary data recorded therein, the check issuer first turns on the power switch 80 of the card type recording and reproducing apparatus 70 to be used as the check issuance apparatus and types on the keyboard 56 the password which was fixed in advance between the finance agency, such as the bank, and the check issuer at such a time when the check issuer opened a current account with the bank (S 01). He then presses the enter key 78 to input the password (S 02). Whether this password coincides with the password that is stored in the RAM 59 or not is detected by the CPU 60 (S 03). If they do not coincide with each other, it is indicated on the display portion 57 that the password is to be input in once again so he inputs again the correct password. He then presses the mode selection key 74 one time only so that it is indicated on the display portion 57 that the then selected mode is that for check issuance. Then by pressing the enter key 78, the check issuance mode is set up (S 04, S 05). Thereupon, an instruction for insertion of a data record card appears on the display portion 57. Then the card 30 is inserted through the card inlet 7 into the card traveling slit 6 (S 06).

By this insertion, the front end portion of the card 30 shields the light of the start switch 24 to turn on the start switch 24, whereby the motor 27 starts to rotate in the direction to move the card 30 in the forward direction (S 07). The torque of the motor 27 after reducing the rotational speed by means of the worm gear 28 is transmitted through the drive shaft 29 to the card driving rollers 12 and 13, which start to rotate in the direction to move the card 30 in the forward direction. Since the spaces between the card driving rollers 12 and 13 and the pinch roller 16 and magnetic reading head 17 are narrower than the thickness of the card 30 as described previously, when the card 30 is further pushed inwards the card driving rollers 12 and 13 and the pinch roller 16 and magnetic reading head 17 sandwich the card 30 therebetween by force due to resiliency of the springs 52 and 43. At this time, since the lever 40 rotates in the counterclockwise direction in FIG. 5, the adjustment screw 42 separates from the lower chassis 5.

Thus, by means of the card driving rollers 12 and 13 and the pinch roller 16, the card 30 is moved in the forward direction in the slit 6, namely, to the right in FIG. 1. Since the card 30 is likewise inserted between the pad roller 15 and the magnetic writing head 19, the card 19 becomes sandwiched between the magnetic writing head 19 and pad roller 15 by force due to resilience of the compression springs 43 and 52. At this time, since the lever 51 is rotated in the clockwise direction in FIG. 5, the rear end of the lever 51 separates from the washer 50. In the same manner, the card 30 is pressed against the thermal head 14 by means of the pad roller 18. During the traveling in the forward direction of the card 30, the data prerecorded in its magnetic stripe 32 such as the bank code, serial number, branch code and the account number are read out by the magnetic reading head 17 (S 08). The card 30 introduced into the card traveling slit 6 is urged downward in FIG. 1 by means of the pair of card position controlling springs 22 as previously described, and therefore the card travels sliding along the other side 21 of the slit 6 and is positioned thereby. Thus, the magnetic reading head 17 never deviates from the recording track of the magnetic stripe 32. The same thing will be applicable to the magnetic writing head 19 to be described later.

Since the magnetic reading head 17 and the magnetic writing head 19 are disposed one after the other in the direction of the forward traveling of the card, the front end of the card 30 is caused to thrust in between the pad roller 15 and the magnetic writing head 19 immediately after the reading out of the data from the data record card 30 has been started by the magnetic reading head 17. Since the pad roller 15 moves upward as indicated by the dotted line in FIG. 5 while sandwiching the card 30 between the same and the magnetic writing head 19, however, the shock at the time the card is thrust therebetween is sufficiently relieved so as not to cause a change in the traveling speed of the card 30 in the forward direction. Therefore, the error rate in the reading of data by the magnetic reading head 17 is reduced. The magnetic reading head 17 and magnetic writing head 19 are integrally fixed to the lever 40 one after the other as described above. Therefore, the position of both the heads 17 and 19 can be adjusted simultaneously by the common adjustment screw 42. In particular, when the card type recording and reproducing apparatus 1 is miniaturized, or made portable, it is required to use a small-sized motor 27 which will not provide sufficiently large force to drive the card 30. In a prior art apparatus, the card 30, at the time that it thrusts as described above, received the shock unmoderated and therefore its traveling speed in the forward direction was instantaneously decreased. For this reaason, the error rate of the magnetic reading head 17 in reading out the data was increased so the reliability on the card type recording and reproducing apparatus 1 was extremely low. Such defect has been effectively corrected in the above described embodiment.

As the card is further moved in the forward direction, the front end of the card 30 comes into abutment with the actuating lever 26 of the stop switch 25 to move the latter in the forward direction to actuate the stop switch 25, whereby the rotation of the motor 27 is stopped and the traveling of the card 30 in the forward direction is ended (S 09). When the motor 27 stops, the card driving rollers 12 and 13 also stop their rotations, whereupon the card 30 is slightly pushed in the backward direction by means of resilience of the operating lever 26. Thereby, the rear end of the card is brought in abutment with the card driving roller 12 and the pinch roller 16 as well as with the card driving roller 13 and magnetic reading head 17 so as to be sandwiched therebetween (S 10). Thus the card 30 is brought in position such that it can be certainly moved in the backward direction by the card driving rollers 12 and 13 upon start of their reverse rotation.

Here, a checkup is made as to whether or not the bank code, branch code, and the account number decided in advance between the finance agency, such as the bank, and the check issuer and stored in the RAM 59 and those read out by the magnetic reading head 17 coincide with each other (S 11). In the case where they are not coincidental, the fact is displayed on the display board and the card 30 is discharged through the card inlet 7 and thereafter the motor 27 stops its rotation as described later (S 26). In the case where they are coincidental, a request for input of the data in the card 30 is displayed on the display portion 57, so the date of issuance is typed by means of the ten-key and then entered by pressing the enter key 78 (S 12, S 13). Then a request for input of the check amount is displayed on the display portion 57, so the check amount is typed by the use of the ten-key and then the enter key is pressed, whereby the check amount is input (S 14, S 15). At this time, the date of issuance and the check amount are stored in the RAM 59 serving as the transaction memory.

When the above mentioned prescribed operations and processing are finished, a switch (not shown) for causing the motor 27 to rotate in the direction to move the card 30 in the backward direction is actuated and the motor 27 is thereby started to rotate in the reverse direction (S 16). Accordingly, the card driving rollers 12 and 13 also start to rotate in the opposite direction to what was mentioned in the foregoing, namely in the direction to move the card 30 in the backward direction. Thus the card 30 starts to travel reversely, namely starts traveling in the backward direction.

Figure 7:
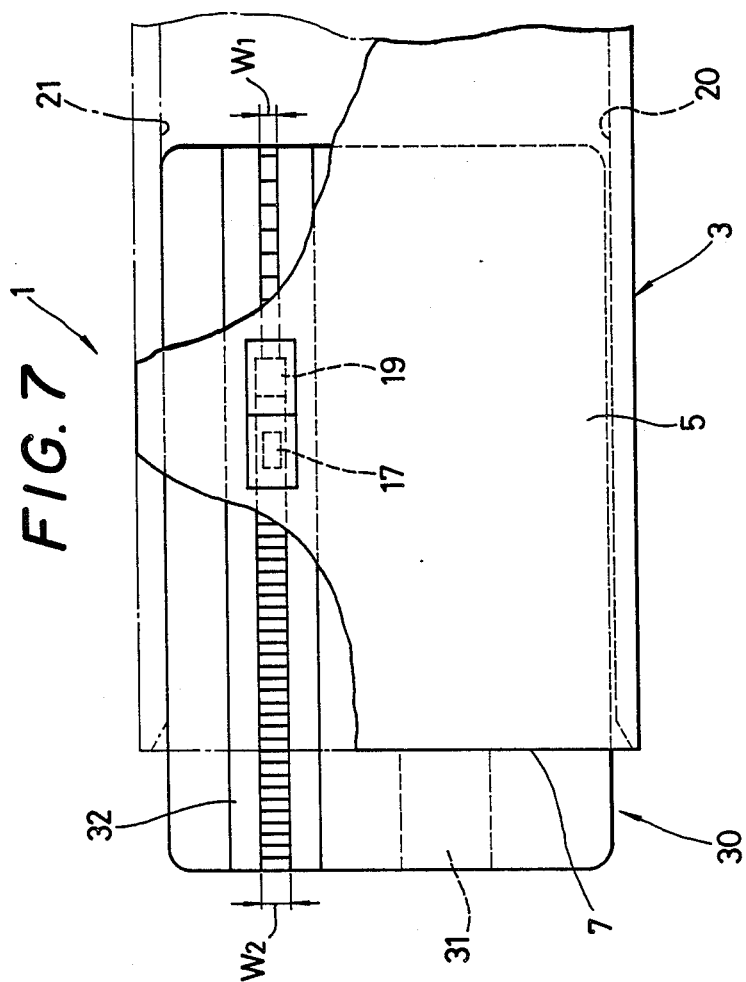
FIG. 7 is a schematic, partial bottom view indicating record widths of new and old data.

During the traveling of the card in the backward direction, the date of issuance and the check amount stored in the RAM are recorded by the magnetic writing head 19 in the magnetic stripe 32 of the card 30, and these recorded date of issuance and check amount are reproduced by the magnetic reading head 17 and stored in the RAM. In connection with the recording of the new data over the prerecorded data in the magnetic stripe 32, the track width W2 for the new data is adapted to be larger than the track width W1 for the prerecorded data, as shown in FIG. 7. Therefore, if some misalignment exists between the track for the prerecorded data and the magnetic writing head 19, there is no danger of any portion of the prerecorded data being left unerased. Since the width of the magnetic writing head 19 is made larger than that of the magnetic reading head 17, the reproducing can be performed with certainty and unnecessary noise is prevented from occurring at the time of the reproducing. Simultaneously with the above processing, the date of issuance and the check amount are visibly printed on the heat sensitive stripe 31 by the thermal head 14 (S 17).

After the reproducing has been finished, the date of issuance and the check amount which have been previously input through the keyboard and stored in the RAM are checked with the data just reproduced by the magnetic reading head 17 and stored in the RAM (S 18). If they coincide with each other, the card is further moved in the backward direction (S 19). The card moved back to the final point of its backward travel will stop there with its rear end projecting out of the card inlet 7 so as to be taken out with the rear end held between fingers. At this time, the display portion 57 indicates that the card is ready for extraction. When the card 30 is thus taken out from the apparatus 1, the extraction is detected by the start switch 24 whereby the motor 27 stops its rotation (S 20).

In the case where the input data and reproduced data are not coincidental, the motor 27 again reverses its rotation and thereby the card stops its backward traveling and starts traveling in the forward direction (S 21). In succession thereto, the same processes are executed as done in the above mentioned steps (S 09, S 10, and S 16) (S 22, S 23 and S 24). While the data record card 30 is traveling forward, the date of issuance and the check amount recorded in the magnetic stripe 32 thereof are overwritten with "0's" and the date of issuance an the check amount written in the heat sensitive stripe 31 are overwritten with "X" marks or the like (S 25). Thereafter, the same processes as that in the steps S 19 and S 20 are executed.

Although the invention has been described in its preferred embodiment in the foregoing, it is possible to make various changes and modifications in the described embodiment without departing from the technical spirit of the invention. For example, the above described card type recording and reproducing apparatus 1 and the data record card 30 can be applied to an automatic batch manufacturing system (ABMS). In that case, a plurality of data record cards 30 each thereof corresponding to the goods to be manufactured may be prepared, the manufacturing processes to be executed may be magnetically recorded in the magnetic stripe 31 of each card 30, and the manufacturing processes which have already been finished may be recorded in the heat sensitive stripe 32. Thereby, process control in the manufacturing will be executed.

According to the present invention as described, it is adapted in a card type recording and reproducing apparatus in which a data record card is moved forwardly and backwardly along a card guide portion of the apparatus such that prerecorded data in the card is read out by a reading head while the card is traveling forward, and new data is written, with the above read out data taken into consideration, on the card by a writing head; operating when the card is then moved backward and further the newly written data is read out from the card by the reading head while the card continues traveling backward. Thus, by the present invention, writing of new data in a data record card with prerecorded data in the card taken into consideration and the reading of the newly written data for checking the same with the data intended to be written in, can be quickly performed with a simply structured card type recording and reproducing apparatus.

We claim as our invention:

1. A portable card writer for writing user supplied data on a card with a magnetic stripe provided thereon adapted to store constant data and user supplied data comprising:
a chassis;

driving means mounted on said chassis for moving said card forwardly and backwardly relative to the chassis;

means for guiding said card along said chassis;

a single magnetic writing head mounted on said chassis aligned with said magnetic stripe for writing during backward movement of said card user supplied data on said card;

a single magnetic reading head mounted on said chassis adjacent to said magnetic writing head and aligned with said magnetic stripe for verifying, during forward motion of said card, constant data recorded on said card and for verifying said user supplied data written by said writing head during backward movement of said card, as said user supplied data is written by said writing head; and printer means for writing said user supplied data on said card at a portion other than said magnetic strip.

2. A portable card writer according to claim 1, in which said magnetic writing head and magnetic reading head are positioned sequentially in front and rear positions relative to the direction of the path of said magnetic stripe, whereby the card passes the reading head before the writing head as the card moves forwardly.

3. A portable card writer according to claim 2, in which said magnetic reading head reads after said magnetic writing head writes as said card moves backwardly.

4. A portable card writer according to claim 3, in which the track width of said magnetic writing head is wider than the track width of said magnetic reading head.

5. A portable card writer according to claim 2, in which said driving means includes a motor.

6. A portable card writer according to claim 5, further comprising switch means positioned at one end of said chassis for deenergizing said motor when pushed by said card.

7. A portable card writer according to claim 6, in which said guiding means includes spring means biasing said card into contact with said guiding means.

8. A portable card writer according to claim 2, further comprising keyboard means providing an output applied to said card by both said magnetic writing head and said printer means.

9. A portable card writer according to claim 8, further comprising memory means in which an output of said keyboard means is stored.

10. Apparatus according to claim 1, wherein said magnetic writing and reading heads are positioned at sequential positions along the direction of the path of said magnetic stripe, means connected to said reading head for reading constant data recorded on said stripe during forward motion of said card, to verify such constant data by coincidence with predetermined constant data, and means connected to said writing head for writing user supplied data on said stripe during reverse movement of said card and connected to said reading head for reading said user supplied data from said magnetic stripe during said reverse movement of said card.

11. A portable magnetic reading and writing apparatus for use with a card having a magnetic strip comprising:

an outer casing;

a chassis provided in said outer casing;

driving means mounted on said chassis for moving said card forwardly and backwardly relative to the chassis;

means for guiding said card along said chassis;

a single magnetic reading head mounted on said chassis for reading information recorded on said magnetic stripe;

a single magnetic writing head having a wider track width than said magnetic reading head for writing information on said magnetic stripe, said magnetic writing head being mounted on said chassis adjacent to said magnetic reading head in the direction in which said card is moved;

printer means for writing data on said card at a portion other than said magnetic stripe, said printer means being mounted on said chassis; and keyboard means for inputting information to be written on said card by said writing head and said printer means;

means for controlling said driving means, said magnetic reading head, said magnetic writing head, and said printer means in response to operation of said keyboard means, wherein said magnetic reading head reads information recorded on said magnetic stripe during a forward movement of said card, information inputted by said keyboard means is written by said magnetic writing head on said magnetic stripe and by said printer means at said portion during a backward movement of said card, and said information written by said magnetic writing head being read by said magnetic reading head, during said backward movement of said card, for verification.

* * * * *